March 22, 1955     A. M. THOMSEN     2,704,437
METHOD OF SUBMARINE PROPULSION
Filed Oct. 3, 1947
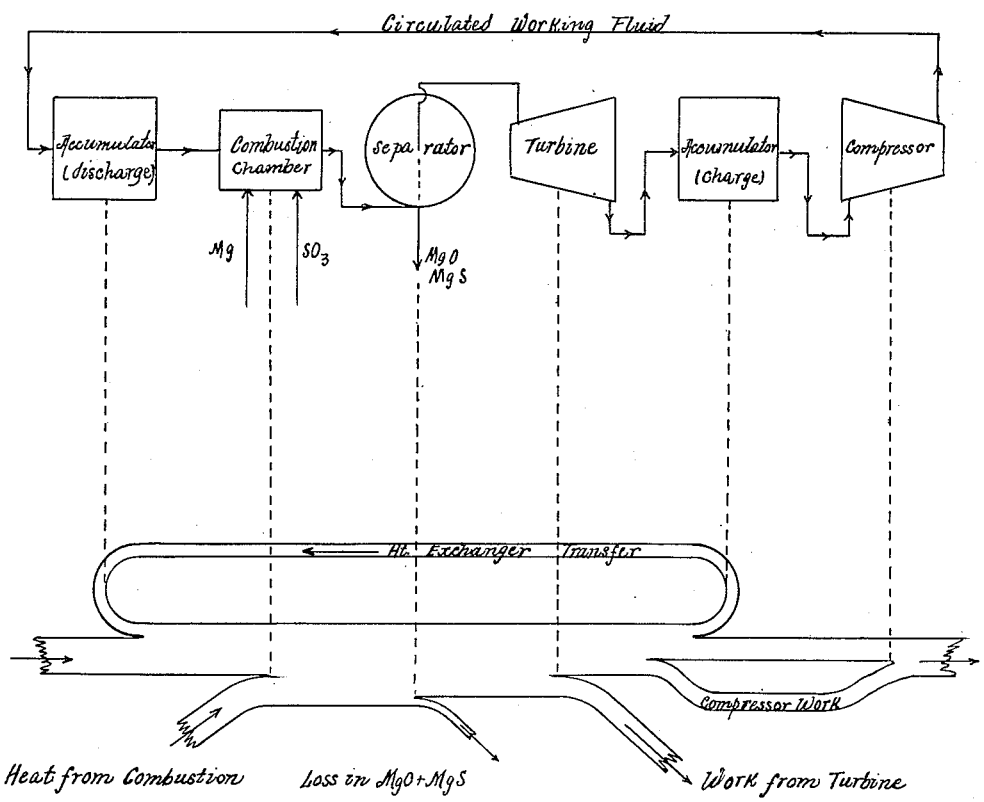
INVENTOR.
Alfred M. Thomsen.

United States Patent Office 2,704,437
Patented Mar. 22, 1955

2,704,437

METHOD OF SUBMARINE PROPULSION

Alfred M. Thomsen, San Francisco, Calif.

Application October 3, 1947, Serial No. 777,845

3 Claims. (Cl. 60—37)

The object of my invention is to permit a submarine to use the same power plant when submerged as when on the surface, thus eliminating the duplicate method of using diesel engines upon the surface and substituting battery power when submerged. I accomplish this object by a change in fuel and by substituting oxygen or an oxygen carrier as a replacement for atmospheric air.

In the accompanying drawing I have shown in a diagrammatic manner the heat cycle on which such a substitution would be based. I have shown a circulated working fluid passing successively through a discharging heat accumulator, where it picks up heat previously stored, and then into a combustion chamber. The fluid becomes further heated herein by the interaction between metallic magnesium and sulphur trioxide and then passes into a separator where the products of said combustion, MgO and MgS, are substantially separated before the working fluid enters the turbine to produce useful work. The exhaust from said turbine then charges a heat accumulator before it is re-compressed and finally re-cycled.

As fuel, I prefer magnesium or aluminum, though alkali metals, alkaline earth metals, and rare light metals are not excluded. By the term "light metals" used herein I designate any one of these metals or any mixture thereof. My invention can be utilized with the present diesel plant, but it would be preferable to use a gas turbine as the motive power. On the surface the use of this device would be conventional, though the simultaneous use of heat recuperation from its exhaust in accordance with my Patent No. 2,326,266, issued August 10, 1943, will result in far greater fuel economy than is possible without the use of such invention.

I refer to the drawings accompanying said patent, 2,326,266, as being fully illustrative of my technique in so far as it relates to the differences between the ordinary type of regenerator, so-called, and the substitution for same of the heat accumulator in a circuit which is my version of a regenerator. However, as said patent deals with an open circuit drawing in atmospheric air and discharging the corresponding products of combustion, I have appended a drawing where I show in a diagrammatic manner the various units which are represented in the instant cycle and also a diagram showing the heat flow as related to the various steps in said cycle. As this is in the nature of a flow sheet rather than of a drawing, I have placed in the name representing the individual device directly upon it.

The drawing is in two parts connected by six dotted lines, linking the specific thermodynamic functions of the various components of the heat flow to the actual devices used in said operation. I have used magnesium as the fuel and sulphur trioxide as the oxygen carrier, thus making this diagram correspond specifically with my claim 3.

Beneath the surface, the fuel would be a "light metal" in conformity with the statement previously made, and the working fluid of the turbine would be an inert gas, such as helium, into which would be commingled the fuel and the oxygen or oxygen carrier so selected that only a solid residue would be produced. This would then be separated from the heated fluid which would then be permitted to expand in the prime mover and thus be partially cooled. It would then be further cooled and the resident heat stored in heat accumulators in accordance with the beforementioned patent, the fluid then re-compressed and again energized by the combustion therein of fuel in oxygen, after the stored heat from the former cycle has been re-conveyed to the compressed working fluid.

Inasmuch as the submarine could be supplied with oxygen from storage tanks I will use this combination with magnesium as the fuel in a preliminary description, but as this is an awkward method of carrying oxygen I shall subsequently give my preferred version in which the fuel is either aluminum or magnesium and the oxygen carrier is $SO_3$.

It will be evident that a helium fluid could be commingled with a definite amount of oxygen and that powdered magnesium injected in such an atmosphere would burn forming MgO. This would be separated either in a vortex or by means of high frequency current, or both, and the heated helium would then pass to the turbine for expansion. After thus doing useful work, the exhaust from the turbine would be stripped of heat in heat accumulators and re-compressed. The compressed helium would then pick up once more the stored heat in the accumulators and would be further heated by fresh additions of oxygen and metallic fuel. The recycling of the helium would thus be accompanied by a continuous heating by combustion and cooling by doing useful work.

It is, of course, essential that the conventional practices of thermodynamics be employed through such a cycle as herein disclosed. As the useful work of the cycle is determined by the difference between the total work delivered by the turbine and the energy absorbed by the compressor it is manifestly advantageous to make this compression phase as efficient as possible. Multi-stage compression with intercooling is thus made mandatory and compression can thus be made as nearly isothermal as is compatible with technical limitations. As the submarine has available unlimited cooling water it will be possible for said compressor to deliver compressed working fluid at a temperature but little above the surrounding sea water. This, in turn, will permit of obtaining an almost theoretical efficiency in the step described in the last paragraph, where I say: "the exhaust from the turbine is then stripped of heat in heat accumulators and recompressed." It is obvious that such cooled gas leaving the heat accumulator must still be a little above the temperature of the fluid delivered by the compressor but the differential can be made very small, as low as 30° F.

To make this claim for high efficiency more intelligible a word may be in order here about heat exchangers. Heat exchange, involving a gas to metal contact, is extremely inefficient yet in conventional design not more than 10 square feet of surface can be allocated for each horse power of actual output. An ACTUAL gas turbine, in use in the Houdry petroleum cracking process, utilizing 1000° F. as the entry temperature to the turbine, delivered as useful work but 16.7% of the heat input. This could be raised to only 24.2% by the use of regeneration in the conventional manner with an allowance of 10 square feet of surface per horse power. If such a regenerator had "infinite surface" the efficiency would become 48%. The inference is obvious.

Manifestly, no actual regenerator, be it of the "counter current with metallic wall division" type, or a heat accumulator, can have "infinite surface," but the same weight-volume factors permits 5 times as much "active surface" to be installed within the same limitations in a heat accumulator. The latter design, therefore, approximates rather closely the theoretical conception.

While efficient heat exchange is assured by the large surface effect inherent in the heat accumulator, such efficient cooling, as herein indicated, is best obtained by direct contact with a water spray. Thus considered even the assumed 30° F. differential between the temperature of the fluid entering and leaving a heat accumulator can be abstracted by a water spray and a still higher compressor efficiency can thus be attained.

In my preferred version, I substitute $SO_3$ as a type of an oxygen carrier. Any metallic oxide, acting on a Thermit reaction, could be used but its release of heat per pound of fuel and oxygen carrier would be less, and in most cases very much less than would be the case if an oxide of a non-metallic element were selected. Again, almost any of these would produce some result but the over-all efficiency of the combination of Al or Mg with $SO_3$, is relatively superior and in addition permits of the use of both reacting substances in vapor form. The lower volatilization temperature of Mg as against Al is likewise in its favor.

This reaction between Mg and SO3 gives rise to much heat in accordance with the following reaction:

$$4Mg + SO_3 = MgS + 3MgO + 417{,}700 \text{ kg. cal.}$$

As the weight of the reacting substances is 176 kg. this means a release of energy of 2,350 kg. cal. per kg. or approximately 4000 B. t. u. per lb. Carbon, burning in oxygen, by comparison liberates but 2,210 cal., for the total weight of carbon and oxygen, per unit involved in the reaction.

Under certain conditions a variety of gaseous substances can be used as working fluids for the engine, in the case of Mg and oxygen previously given, superheated steam will serve very well. However, helium has a peculiar advantage because, being a monatomic gas its specific heat is relatively low, hence, the amount of heat to be stored in heat recuperation becomes somewhat less than would be the case with such a working fluid as superheated steam. Of course, the inertness of the gas is also very much in its favor. The item of corrosion might seem to be of importance in the case of SO3, but it will be obvious that a slight excess of magnesium metal in the combustion chamber will insure against the presence of sulphur or any sulphur compound save the inert MgS.

So far the description has indicated the turbine as the motive power, but it is equally obvious that a valve change only would be required to make a 4 cycle diesel into an expansion device for such a working fluid as herein described, the compression being furnished by another machine and suitable heat recuperators such as indicated in the patent cited would complete the alteration.

Having thus fully described my invention I claim:

1. The method of power generation which comprises; heating the working fluid of a prime mover by commingling therewith a light metal, selected from the group of metals having a specific gravity below 2.8 and thus containing aluminum and magnesium and oxygen; separating the oxide produced thereby; expanding the heated fluid in a prime mover thus lowering its temperature; abstracting a further portion of heat still resident in the expanded fluid by storing same in a heat accumulator; recompressing the fluid to its initial pressure; reheating same by conveyance of the heat previously stored; restoring the fluid to the initial temperature by further combustion therein of commingled oxygen and metal thus recycling the working fluid substantially unchanged.

2. The method of power generation which comprises; heating the continuously recirculated fluid of a prime mover by commingling therewith a light metal, selected from the group of metals having a specific gravity below 2.8 and thus containing aluminum and magnesium, and an oxygen containing substance so selected that the result of the reaction shall be solid substances inert towards the working fluid of the prime mover; stripping said solids from the fluid; cooling the stripped fluid by expansion within the prime mover; thus producing useful work; storing the heat still resident in the expanded fluid in a heat accumulator; recompressing the cooled fluid; reheating the compressed fluid by means of the heat stored in said accumulator; further heating said fluid by the use of the means formerly employed thus re-commencing the cycle.

3. The method of power generator which comprises; heating helium, being the continuously circulated fluid of a prime mover, by commingling therewith a light metal, selected from the group of metals having a specific gravity below 2.8 and thus containing aluminum and magnesium and sulphur trioxide, in such amounts that the products of reaction shall contain substantially magnesium sulphide and oxide; separating said solids to such an extent that the residual shall not interfere with the operation of said prime mover; expanding said helium in the prime mover thus producing useful work; cooling the expanded helium by storing the heat resident therein in heat accumulators; recompressing the cooled helium; reheating the compressed helium by means of the stored heat in said accumulators; further heating of said compressed and partially heated helium by commingling therewith magnesium and sulphur trioxide thus recommencing the cycle.

References Cited in the file of this patent

UNITED STATES PATENTS

| 1,506,323 | O'Neill | Aug. 26, 1924 |
| 1,532,930 | O'Neill | Apr. 7, 1925 |
| 2,303,381 | New | Dec. 1, 1942 |

OTHER REFERENCES

"Power," October 1946, pages 82–85.